(12) United States Patent
Matsuoka et al.

(10) Patent No.: US 7,797,547 B2
(45) Date of Patent: Sep. 14, 2010

(54) INFORMATION PROCESSING APPARATUS AND METHOD OF CONTROLLING AUTHENTICATION PROCESS

(75) Inventors: Yoshio Matsuoka, Ome (JP); Mayumi Maeda, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1082 days.

(21) Appl. No.: 11/494,646

(22) Filed: Jul. 28, 2006

(65) Prior Publication Data

US 2007/0050632 A1    Mar. 1, 2007

(30) Foreign Application Priority Data

Aug. 23, 2005    (JP) ............... 2005-241217

(51) Int. Cl.
*H04K 1/00* (2006.01)
*H04L 9/00* (2006.01)

(52) U.S. Cl. .............. 713/182; 713/183; 713/168; 713/186; 713/169; 726/2

(58) Field of Classification Search ........... 713/159, 713/182, 168, 169–170, 183, 186; 726/2
See application file for complete search history.

(56) References Cited

U.S. PATENT DOCUMENTS 5,875,345 A    2/1999    Naito et al.

2007/0226490 A1 *    9/2007    Odawara et al. ............ 713/159
2007/0294528 A1 *    12/2007    Shoji et al. .................. 713/159

FOREIGN PATENT DOCUMENTS

| JP | 2000-322363 | * | 1/2000 |
| JP | 2003-108256 |   | 4/2003 |
| JP | 2003-122443 |   | 4/2003 |
| JP | 2004-259000 | * | 9/2004 |

OTHER PUBLICATIONS

Groupmax World Wide Web Desktop Version 6, System Administrators Guide, Explanation, Manual, Operating Guide, First Edition, Hitachi Ltd., Dec. 2000, p. 41.
Notification of Reasons for Rejection mailed Nov. 13, 2007 in counterpart Japanese Patent Application No. 2005-241217.

* cited by examiner

*Primary Examiner*—Nasser Moazzami
*Assistant Examiner*—Fikremariam Yalew
(74) *Attorney, Agent, or Firm*—Finnegan, Henderson, Farabow, Garrett & Dunner, L.L.P.

(57) ABSTRACT

According to one embodiment, an information processing apparatus includes a main body, a first authentication unit which performs a first authentication process to authenticate a user when the main body is powered on, a second authentication unit which performs a second authentication process to authenticate the user after the user is authenticated in the first authentication process, and an authentication skip control unit which skips the first authentication process until a given time period elapses since the user is last authenticated in the second authentication process.

7 Claims, 8 Drawing Sheets

INFORMATION PROCESSING APPARATUS AND METHOD OF CONTROLLING AUTHENTICATION PROCESS

CROSS-REFERENCE TO RELATED APPLICATION

This application is based upon and claims the benefit of priority from Japanese Patent Application No. 2005-241217, filed Aug. 23, 2005, the entire contents of which are incorporated herein by reference.

BACKGROUND

1. Field

One embodiment of the invention relates to an information processing apparatus such as a personal computer, for example, having a user authentication function.

2. Description of the Related Art

Portable personal computers of various types such as a laptop type and a notebook type have recently been developed. These computers have a user authentication function to prevent unauthorized use of the computers.

As the user authentication function, a basic input output system (BIOS) password function is known. The BIOS password function is a function of performing an authentication process to authenticate a user when a computer is powered on. All of the operations including a system boot-up process are inhibited unless a BIOS password stored in advance in the computer and a password typed by the user match with each other. The BIOS password function therefore protects the computer against unauthorized use in the event of theft.

Jpn. Pat. Appln. KOKAI Publication No. 2003-108256 discloses a computer with a BIOS password function as described above.

When a user sets a BIOS password function in a computer, he or she is required to input a password each time the computer starts up. It is relatively troublesome for the user to input the password.

Usually, a user has to type a password to log on to an operating system even after he or she is authenticated by a BIOS password. If the user sets a BIOS password function in a computer, he or she has to always type the password two times. This is a major cause of decreasing usability.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes a main body, a first authentication unit which performs a first authentication process to authenticate a user when the main body is powered on, a second authentication unit which performs a second authentication process to authenticate the user after the user is authenticated in the first authentication process, and an authentication skip control unit which skips the first authentication process until a given time period elapses since the user is last authenticated in the second authentication process.

Figure 1:
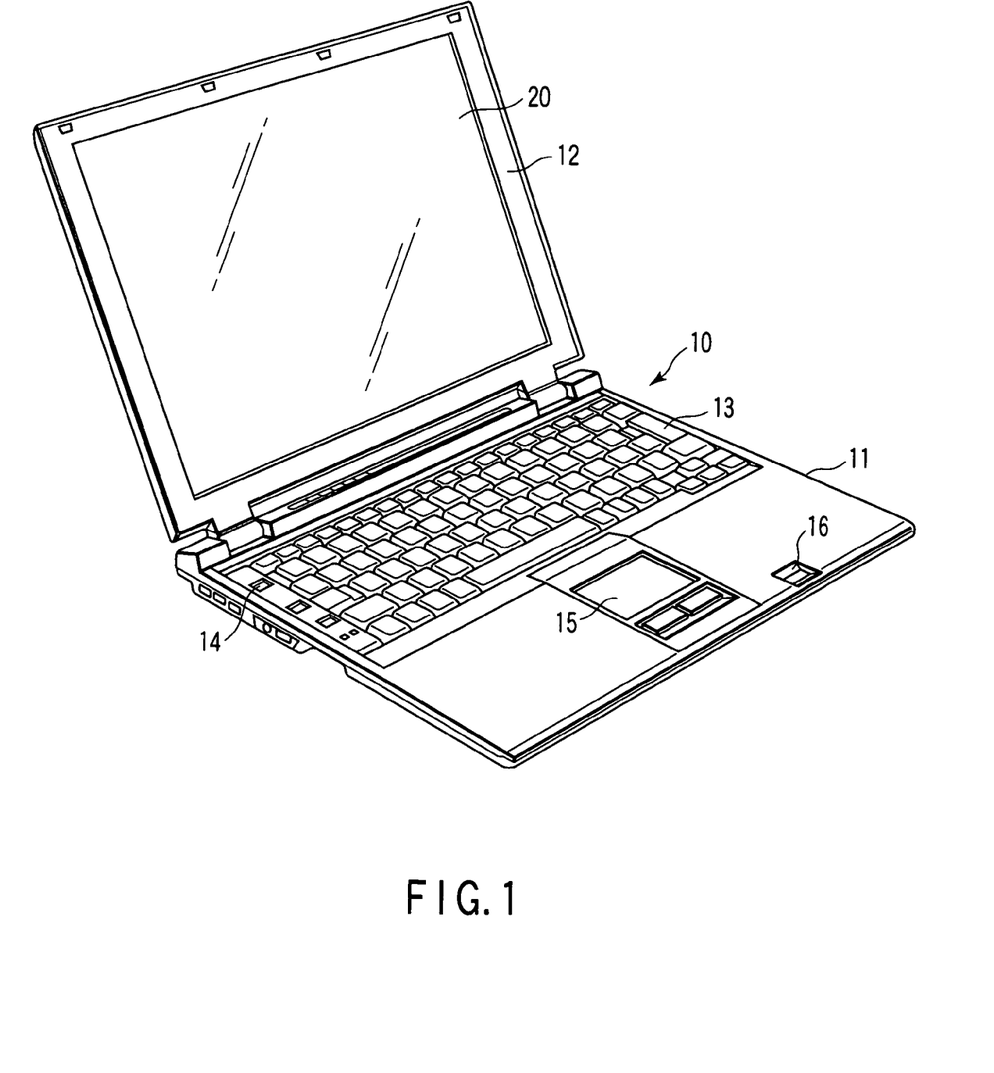
FIG. 1 is an exemplary perspective view of an outward appearance of an information processing apparatus according to an embodiment of the invention.
Figure 2:
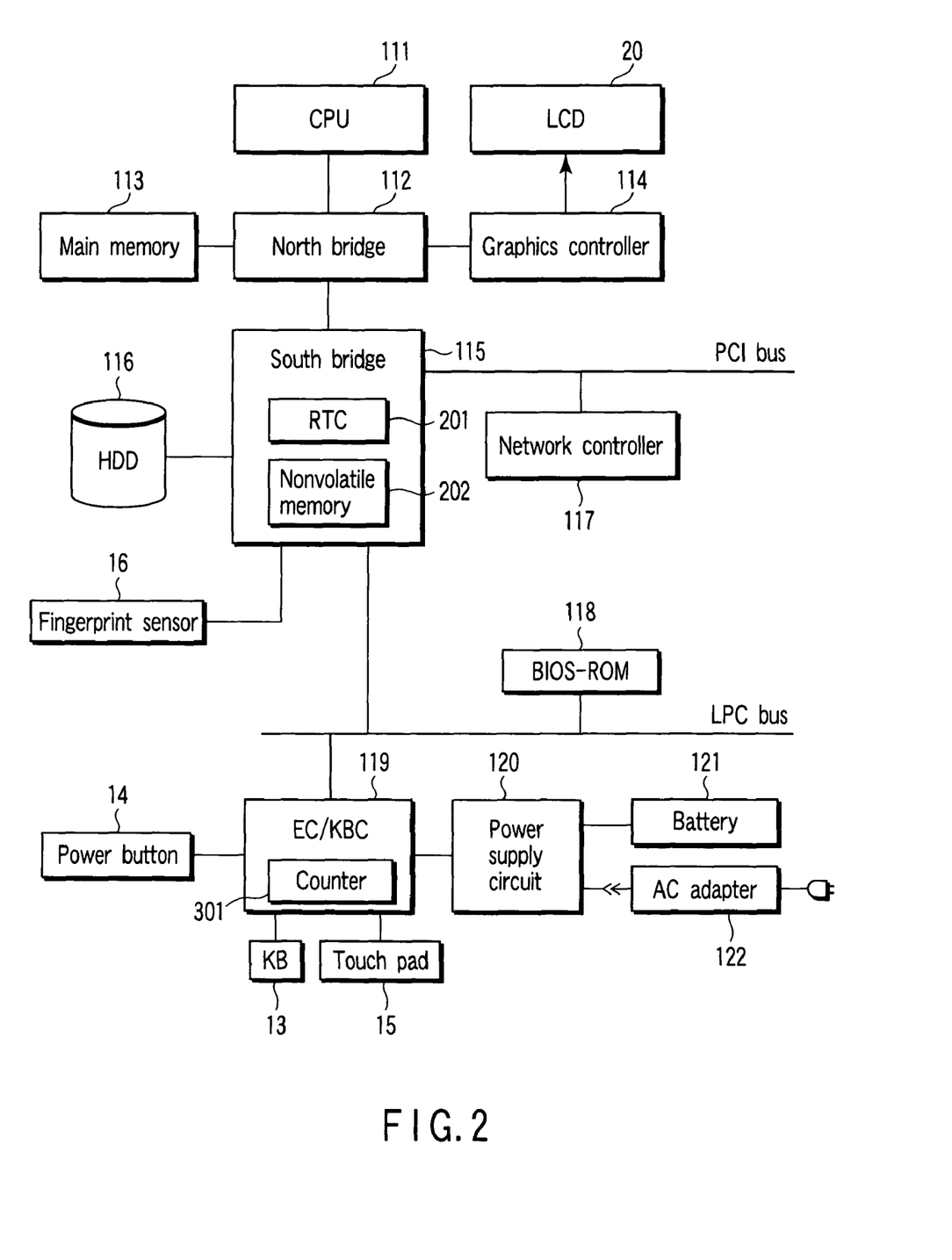
FIG. 2 is an exemplary block diagram of a system configuration of the information processing apparatus shown in FIG. 1.

Referring first to FIGS. 1 and 2, the configuration of an information processing apparatus according to the embodiment will be described. The information processing apparatus is implemented as, for example, a battery-operable, portable notebook personal computer 10.

FIG. 1 is a perspective view of the notebook personal computer 10 whose display unit is open.

The computer 10 includes a main body 11 and a display unit 12. The display unit 12 incorporates a display device that is formed of a liquid crystal display (LCD) 20. The display screen of the LCD 20 is located in almost the central part of the display unit 12.

The display unit 12 is attached to the main body 11 such that it can turn freely between an open position in which the top surface of the main body 11 is exposed and a closed position in which the top surface thereof is covered. The main body 11 has a thin box-shaped housing. A keyboard 13, a power button 14 for powering on/powering off the computer 10, a touch pad 15, and a fingerprint sensor 16 are arranged on the top surface of the main body 11. The fingerprint sensor 16 is used to detect a user's fingerprint.

FIG. 2 shows an example of a system configuration of the computer 10.

The computer 10 includes a CPU 111, a north bridge 112, a main memory 113, a graphics controller 114, a south bridge 115, a hard disk drive (HDD) 116, a network controller 117, a flash BIOS-ROM 118, an embedded controller/keyboard controller IC (EC/KBC) 119, and a power supply circuit 120.

The CPU 111 is a processor for controlling the operation of each of components. The CPU 111 executes an operating system and various application programs/utility programs. The operating system and programs are loaded into the main memory 113 from the HDD 116. The CPU 111 also executes a basic input output system (BIOS) stored in the flash BIOS-ROM 118. The BIOS is a program for controlling hardware.

The north bridge 112 is a bridge device for connecting a local bus of the CPU 111 and the south bridge 116. The north bridge 112 has a function of communicating with the graphics controller 114 via an accelerated graphics port (AGP) bus. The north bridge 112 incorporates a memory controller for controlling the main memory 113.

The graphics controller 114 is a display controller for controlling the LCD 20 that is used as a display monitor of the computer 10. The south bridge 115 is connected to a peripheral component interconnect (PCI) bus and a low pin count (LPC) bus.

The south bridge 115 incorporates a real-time clock (RTC) 201 and a nonvolatile memory 202. The real-time clock 201 is a clock module for measuring date and time and operated by a dedicated battery even while the computer 10 is powered off.

The EC/KBC 119 is a one-chip microcomputer on which an embedded controller for managing power and a keyboard controller for controlling the keyboard (KB) 13 and the touch pad 15 are integrated. The EC/KBC 119 powers on/powers off the computer 10 by a user's depression of the power button 14 in association with the power supply circuit 120. The power supply circuit 120 generates system power, which is to be applied to the components of the computer 10, using a battery 121 or an external power that is applied via an AC adapter 122.

The computer 10 incorporates an authentication function. The authentication function will be described with reference to FIG. 3.

Figure 3:
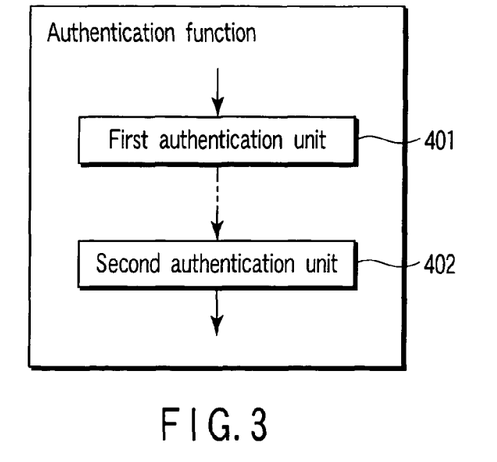
FIG. 3 is an exemplary illustration of an authentication function incorporated in the information processing apparatus shown in FIG. 1.

The computer 10 includes a first authentication unit 401 and a second authentication unit 402. The first authentication unit 401 performs a first authentication process to authenticate a user when the main body 11 is powered on.

The first authentication process is performed before a system program such as an operating system is booted up, and implemented by, for example, a BIOS authentication process that is performed by the BIOS. If authentication information (user password, or biometric information such as a fingerprint) is registered in advance in the computer 10, the BIOS requests a user to input the authentication information when the main body 11 is powered on. The BIOS compares the authentication information input by user's operation of the input device (keyboard 13 or fingerprint sensor 16) with the authentication information registered in advance to determine whether the user is authenticated to use the computer 10. If the user is authenticated, the BIOS permits, for example, a boot-up process of the operating system. All of the operations including the boot-up process are inhibited by the BIOS until the BIOS determines that the user is authenticated. The first authentication process can protect the computer 10 from unauthorized use in the event of theft.

The user password is also referred to as a BIOS password. The user password is registered by a setup function provided by the BIOS or a dedicated utility program. The registered user password is stored in a BIOS-ROM 118, a nonvolatile memory 202 or the like. The biometric information such as a fingerprint is also registered by the setup function provided by the BIOS or the dedicated utility program.

The second authentication unit 402 performs a second authentication process to authenticate the user after the first authentication process is performed. More specifically, the second authentication process is performed after the user is authenticated in the first authentication process. The second authentication process is achieved by a logon authentication process to determine whether the user can log onto (or log into) the operating system. This logon authentication process is carried out by the operating system.

The second authentication process is not limited to the logon authentication process. When the main body 11 is powered on, or before the operating system is booted up, both the first and second authentication processes can be carried out. In this case, for example, the BIOS performs a BIOS password authentication process as the first authentication process and performs a BIOS biometric authentication process as the second authentication process.

In the BIOS password authentication process, the BIOS compares the user passwords registered in advance in the computer 10 and a password typed by a user and authenticates the user on the basis of the comparison. If the user is authenticated, the BIOS biometric authentication process is carried out.

In the BIOS biometric authentication process, the BIOS compares the fingerprints registered in advance in the computer 10 and a fingerprint input by a user through the fingerprint sensor 16 and authenticates the user on the basis of the comparison. If the user is authenticated, the BIOS permits, for example, the boot-up process of the operating system.

As described above, the authentication process performed when the computer 10 is powered on is extremely effective in protecting the computer 10 against unauthorized use. However, some users feel it troublesome that the authentication process is performed each time the computer 10 is powered on.

The computer 10 has a new function of improving usability with an effect of preventing unauthorized use. Hereinafter this function will be called an antitheft protection timer function.

The antitheft protection timer function is a function of skipping the first authentication process until a given period of time (days, hours, etc.) elapses since a user is last authenticated in the second authentication process. In other words, if a time period (days or hours) from when a user is last authenticated in the second authentication process until the computer 10 is next powered on does not exceed a given time period, the first authentication process is automatically skipped, and the user is determined as one authenticated in the first authentication process.

If the computer 10 is powered on after the time elapsed since the user is last authenticated in the second authentication process exceeds a given time period, the first authentication process is normally performed and the user is required to input his or her password.

As long as the authenticated user uses the computer 10 with a certain frequency such as every day and every few days, the first authentication process is not performed even though the computer 10 is powered on. The user can use the computer 10 only if he or she is authenticated in the second authentication process.

If the computer 10 is stolen and the time elapsed since the user is last authenticated in the second authentication process exceeds a given time period, the first authentication process is performed when the computer 10 is powered on. Unless a user inputs the same authentication information as the registered authentication information (user password or biometric information such as a fingerprint), he or she cannot use the computer 10.

As described above, if the time elapsed since the user is last authenticated in the second authentication process exceeds a given time period, no one but the authenticated user can use the computer 10. The antitheft protection timer function can contribute to not only the improvement of usability but also the prevention/inhibition of theft and resale of the computer 10.

Figure 4:
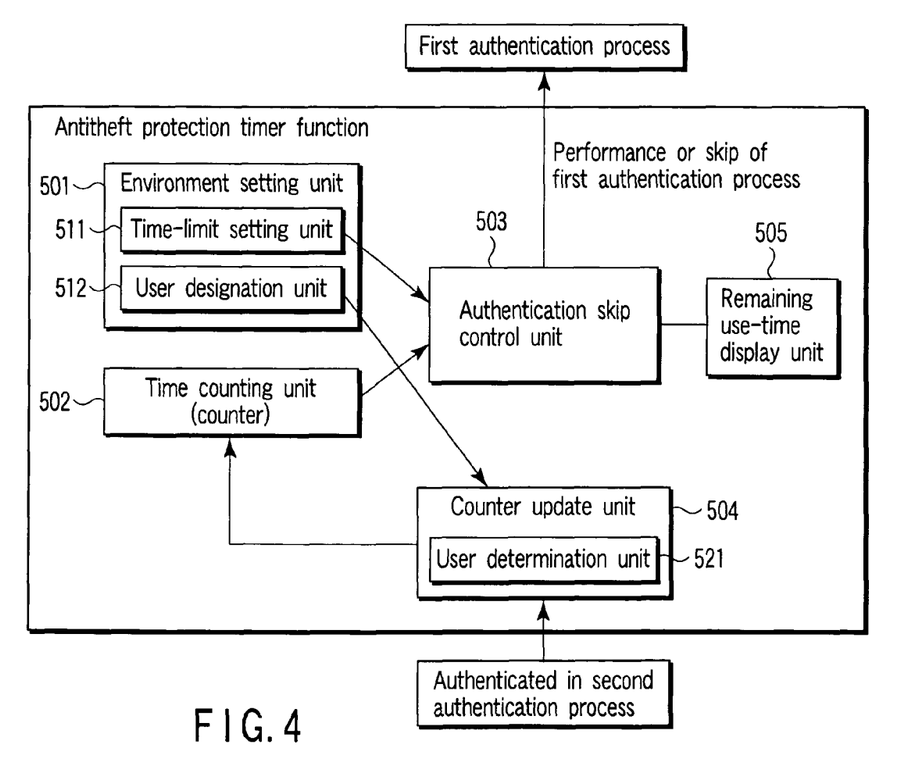
FIG. 4 is an exemplary illustration of an antitheft protection timer function provided in the information processing apparatus shown in FIG. 1.

A configuration for fulfilling the antitheft protection timer function will be described with reference to FIG. 4.

The antitheft protection timer function is fulfilled by a system environment setting unit 501, a time counting unit 502, an authentication skip control unit 503, a counter update unit 504 and a remaining use-time display unit 505.

The system environment setting unit 501 sets system environments regarding the antitheft protection timer function in accordance with a user's operation. The unit 501 includes a time-limit setting unit 511 and a user designation unit 512. The time-limit setting unit 511 sets time-limit information in accordance with a user's operation to designate the above given time period. As time limit L that can be designated by the time-limit information, the limited number of days can be used and, in this case, time limit L ranges, for example, from one to twenty-eight days. The unit 501 is implemented by utility programs.

The time counting unit 502 counts time elapsed since the user is last authenticated in the second authentication process. This counting is performed using a counter 301 provided in the EC/KBC 119. Every time the user is authenticated in the second authentication process, the counter update unit 504 resets the value of the counter 301, and the counter 301 restarts to count the elapsed time. The value of the counter 301 therefore represents an elapsed time period D from time A when the user is last authenticated in the second authentication process to time B when the computer 10 is next powered on (D=B−A).

When the computer 10 is powered on, the authentication skip control unit 503 determines whether the elapsed time period D exceeds time limit L. If the elapsed time period D does not exceed the time limit L, the unit 503 skips the first authentication process. Whether the elapsed time period D exceeds the time limit L is determined by comparing the value of the counter 301 and the time limit L. The unit 503 is implemented by, e.g., a BIOS.

The counter update unit 504 resets the counter 301 and causes the counter 301 to restart its count operation each time the user is authenticated in the second authentication process, as described above.

The counter update unit 504 can be provided with a user determination unit 521. The unit 521 determines whether the user authenticated in the second authentication process is one having specific authority. The user having specific authority is designated in advance by the user designation unit 512 of the system environment setting unit 501. If the user authenticated in the second authentication process is one designated in advance by the unit 512, the unit 521 determines that the user has specific authority. When the conditions that the user is authenticated in the second authentication process and has specific authority are met, the counter update unit 504 resets the counter 301 and causes the counter 301 to restart its count operation.

The counter update 504 is implemented by a BIOS alone or a BIOS and a utility program in combination.

The remaining use-time display unit 505 displays, on the LCD 20, a period of time remaining until the elapsed time period D reaches the time limit L as the remaining period of use time (the remaining use days) of the computer 10. The remaining period of use time is displayed in order to notify the third party that the number of days for which the computer 10 can be used is limited in the event of theft. A certain advantage of crime prevention can thus be obtained.

Figure 5:
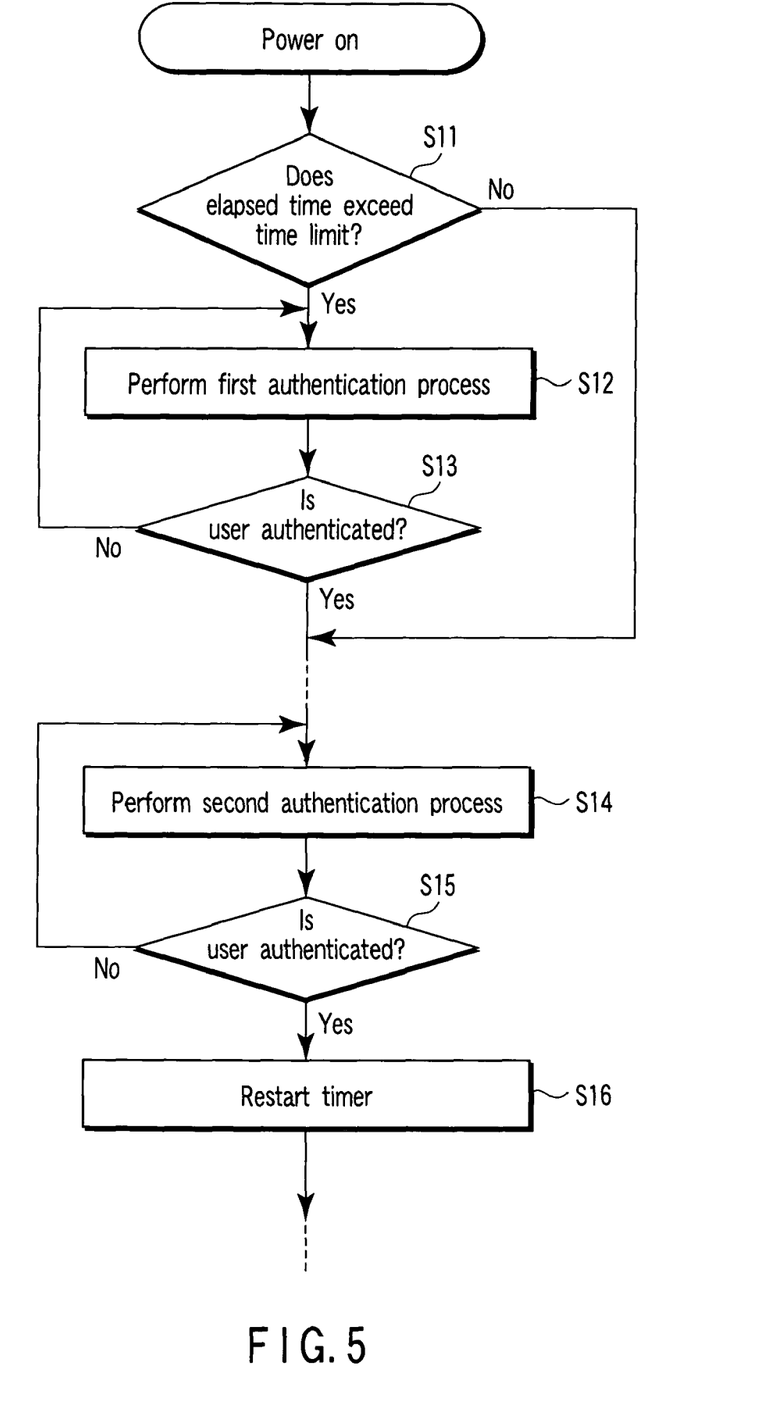
FIG. 5 is an exemplary flowchart illustrating a basic procedure for an authentication control process performed by the information processing apparatus shown in FIG. 1.

A basic procedure for performing an authentication control process by the antitheft protection timer function will be described with reference to the flowchart shown in FIG. 5.

When the computer 10 is powered on, the BIOS determines whether the elapsed time period D exceeds the time limit L (block S11).

If the elapsed time period D exceeds the time limit L (YES in block S11), the first authentication process is performed (block S12). When a user is not authenticated in the first authentication process, or when authentication information input by the user does not match with the registered authentication information (NO in block S13), the flow does not advance to the next process. Unless the user is authenticated in the first authentication process, the computer 10 is inhibited from being used.

After the user is authenticated in the first authentication process, or after the authentication information input by the user and the registered authentication information match with each other (YES in block S13), the second authentication process is performed (block S14). When the user is authenticated in the second authentication process (block S15), the value of a timer is reset and the timer restarts its time measurement operation (block S16).

On the other hand, if the elapsed time period D does not exceed the time limit L (NO in block S11), the first authentication process is skipped. Thus, the user need not input authentication information for the first authentication process.

A specific procedure for performing the authentication control process will be described with reference to the flowchart shown in FIG. 6. Assume here that the above-described logon authentication process is used as the second authentication process.

Figure 7:
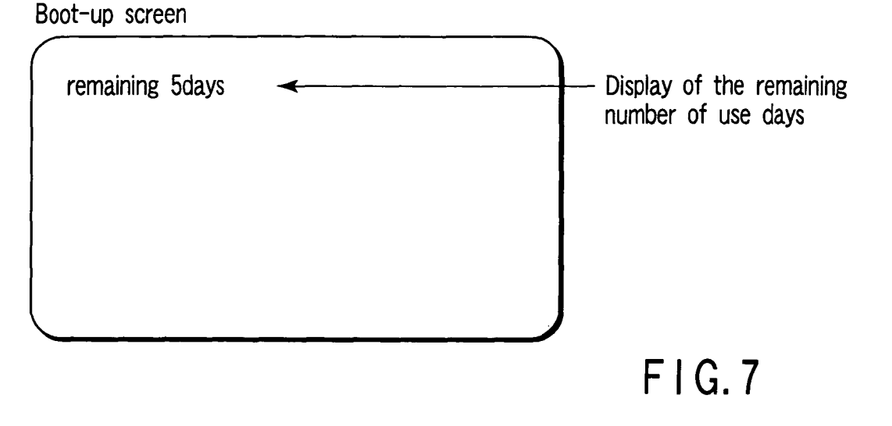
FIG. 7 is an exemplary illustration of an example of a boot-up screen used in the information processing apparatus shown in FIG. 1.
Figure 8:
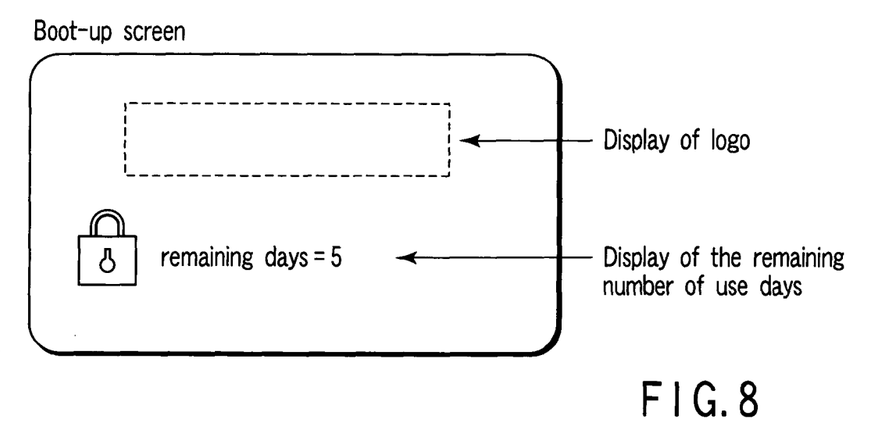
FIG. 8 is an exemplary illustration of another example of the boot-up screen used in the information processing apparatus shown in FIG. 1.

When the computer 10 is powered on, the BIOS displays a boot-up screen indicating the remaining use time (the remaining use days) of the computer 10 on the LCD 20 (block S101). FIGS. 7 and 8 each illustrate an example of the boot-up screen. The boot-up screen shown in FIG. 7 displays the remaining number of use days using text data. If the remaining number of use days is five, a message "remaining 5 days" is displayed by text data. The boot-up screen shown in FIG. 8 displays the remaining number of use days and an icon of, e.g., a key, together with the logotype of a computer vendor or the like.

After the boot-up screen shown in FIG. 7 or FIG. 8 is displayed, the BIOS reads value D of the counter 301 and compares it with time limit L (block S102). On the basis of the comparison result, the BIOS determines whether value D exceeds time limit L, or whether the time elapsed from when a user is last authenticated in the second authentication process (logon authentication process) exceeds time limit L (block S103).

If the elapsed time exceeds time limit L (YES in block S103), the BIOS displays an authentication screen on the LCD 20 and requests the user to input his or her user password in order to perform the first authentication process (block S104). The authentication screen displays a text message (PASSWORD=) that requests the user to input the user password. The text message (PASSWORD=) can be displayed on the boot-up screen of FIG. 7.

When the user types the user password (block S105), the BIOS compares the typed user password with the registered user passwords and determines whether it is correct or not (block S106).

If the typed user password matches with the registered user passwords, or if the typed user password is correct (YES in block S106), the BIOS starts a boot sequence to boot up the operating system (block S107).

On the other hand, if the elapsed time period D does not exceed the time limit L (NO in block S103), the BIOS skips blocks S104, S105 and S106 and moves to block S107 in order to skip the first authentication process.

When the operating system is booted up, the operating system displays the logon authentication screen on the LCD 121 and requests the user to input a user name and a logon password in order to perform the second authentication process (block S108). If the logon password is correct, or if the user is authenticated in the second authentication process (YES in block S110), the operating system starts a process for setting operation environment corresponding to the logged-on user. When the utility program that runs on the operating system detects that the user is authenticated in the second authentication process, the utility program performs a process of restarting the counter 301 in association with the BIOS (block S111). In block S111, the utility program notifies the BIOS that the user succeeds in logon authentication. The BIOS resets the count value of the counter 301 and restarts the count operation of the counter 301. The count operation is continued even during the power-off of the computer 10. This count operation during the power-off of the computer 10 may be carried out using the real-time clock (RTC) 201.

In block S111, the BIOS can store time A at which the user succeeded in the logon authentication in the nonvolatile memory 202. In block S102, the BIOS can compare a difference between time A stored in the memory 202 and current time B at which the computer is powered on (B−A) with time limit L.

After the counter 301 restarts, the operating system starts a normal operation (block S112).

The utility program sets time-limit information. The user starts the utility program and inputs a value of time limit (hours or days) L (block S201). The utility program stores the input value in the nonvolatile memory 202 or the like (block S202).

Figure 9:
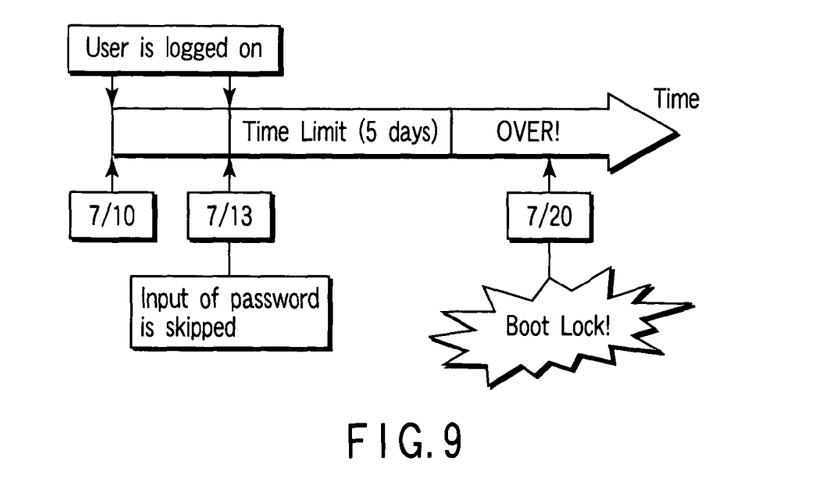
FIG. 9 is an exemplary schematic diagram explaining the antitheft protection timer function provided in the information processing apparatus shown in FIG. 1.

FIG. 9 schematically shows the antitheft protection timer function.

It is assumed in FIG. 9 that the time limit is five days. If a user is last authenticated in logon authentication on July 10 and then powers on the computer 10 on July 13, the first authentication process is skipped. When the user is authenticated again in logon authentication, the timer 301 restarts. After that, if no logon authentication is executed any more and the computer 10 is powered on on July 20, the first authentication process is performed in response to the power-on of the computer 10. Accordingly, the third party cannot operate the computer 10 at all.

Figure 10:
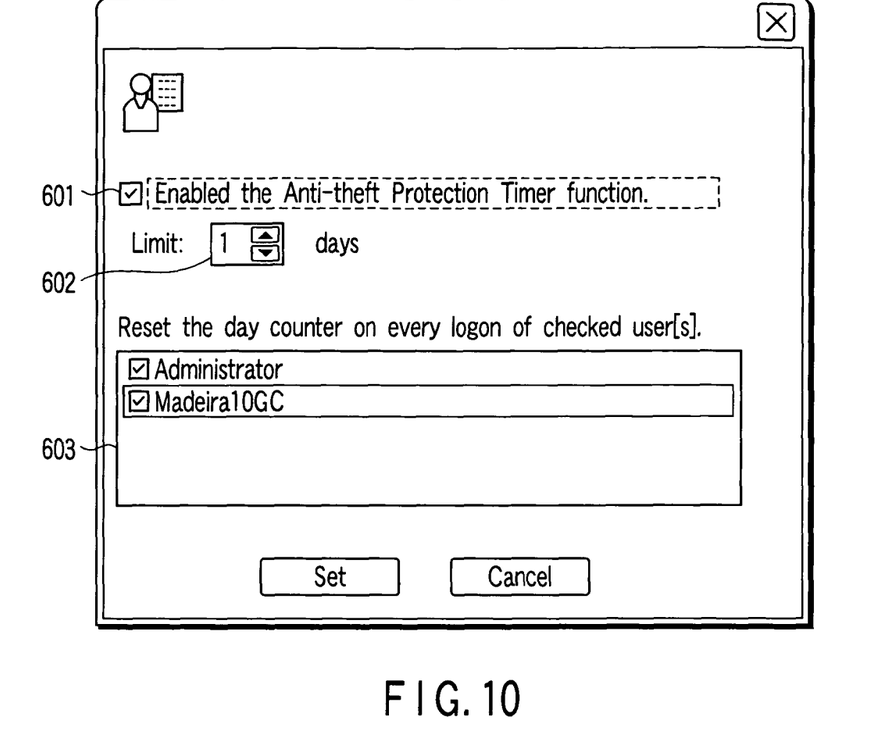
FIG. 10 is an exemplary diagram showing an example of a system environment setting screen used in the information processing apparatus shown in FIG. 1.

FIG. 10 shows an example of a system environment setting screen regarding the antitheft protection timer function.

The system environment setting screen displays a check box 601 for designating whether the antitheft protection timer function is valid or invalid, an input field 602 for designating time limit (days or hours) and a field 603 for designating a user who has the authority of resetting the counter 301.

The field 603 shows a list of names of users who can log onto the operating system. A check box is provided for each of the names of users. The user can check a check box to designate a user name who has the authority of resetting the counter 301. The name of the user who has the authority of resetting the counter 301 is stored in the nonvolatile memory 202 as a user name list.

Figure 6:
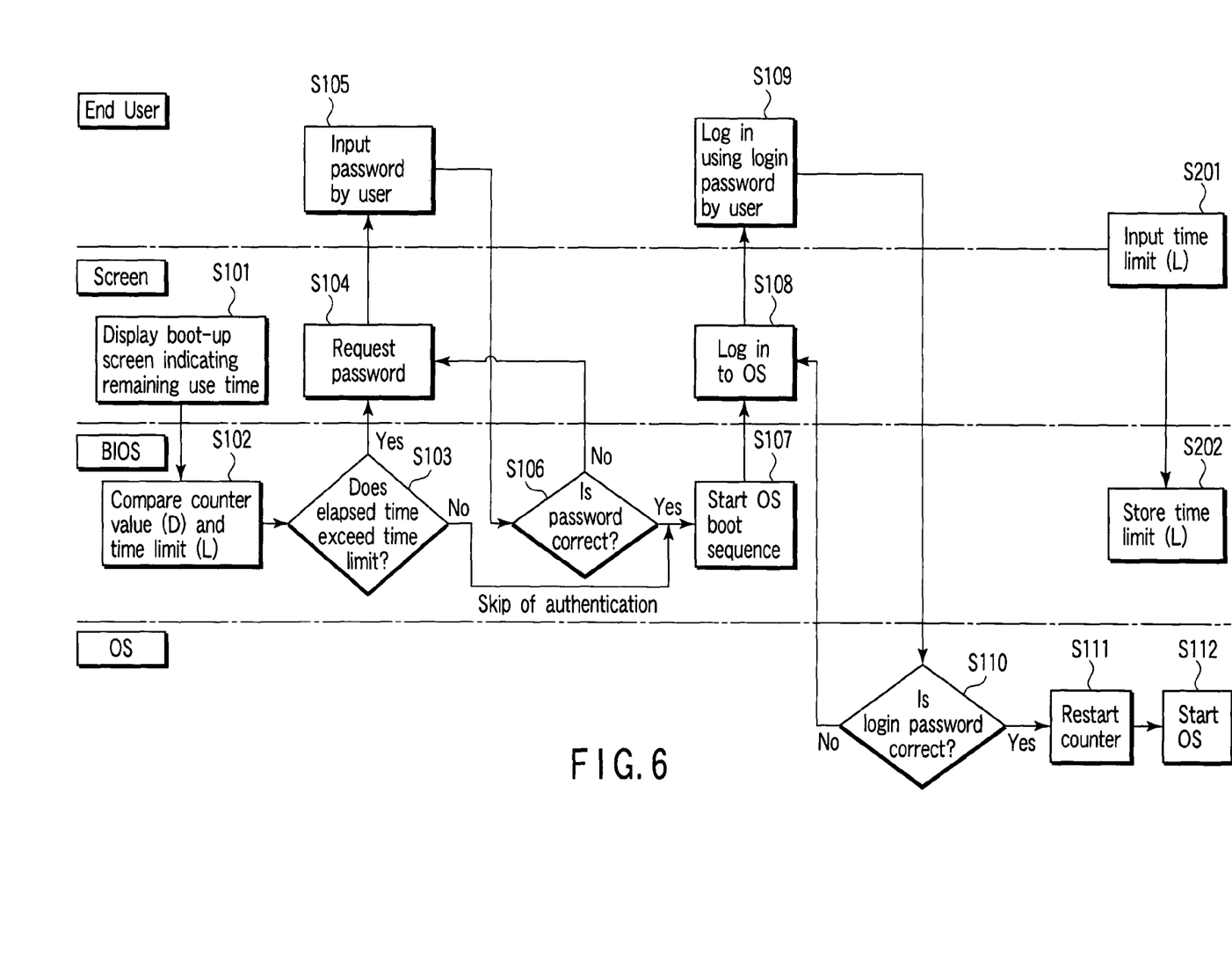
FIG. 6 is an exemplary flowchart of a specific procedure for performing an authentication control process by the information processing apparatus shown in FIG. 1.
Figure 11:
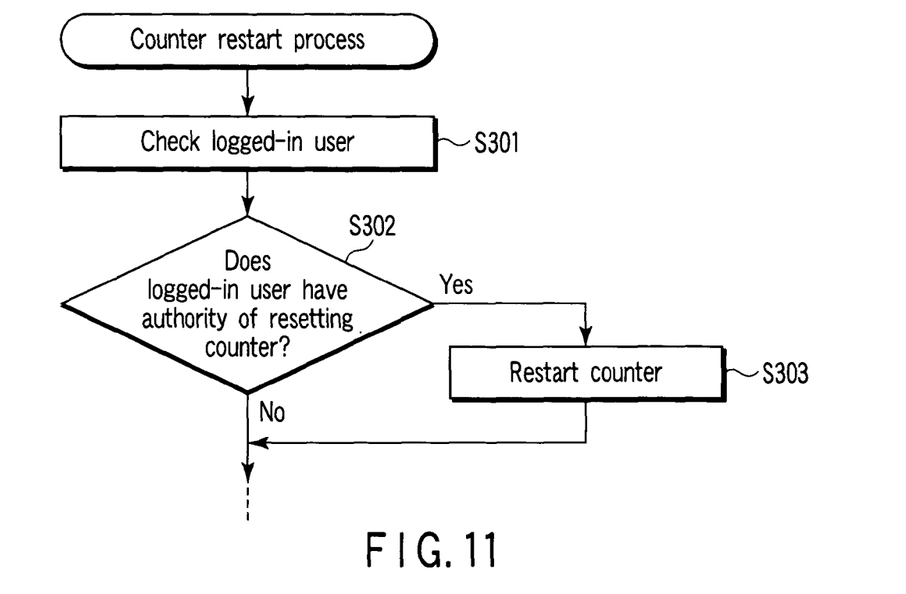
FIG. 11 is an exemplary flowchart showing a procedure for performing a counter restart process by the information processing apparatus shown in FIG. 1.

FIG. 11 is a flowchart showing a procedure for performing the process of block S111 in FIG. 6.

When the utility program detects that a user has succeeded in logon authentication, the utility program acquires the name of the user from the operating system (block S301). Then, the utility program checks whether the name of the user is included in a user name list and determines whether the user is one who has the authority of resetting the counter 301 (block S302).

If the user who has succeeded in logon authentication has the authority of resetting the counter 301 (YES in block S302), the utility program resets the value of the counter 301 and restarts to operate the counter 301 in association with the BIOS (block S303). If the user does not have the authority (NO in block S302), the process of the block S303 is not performed. Even though the user succeeds in logon authentication, the value of elapsed time period D is not reset to zero, but the count of elapsed time period D is continued.

Even a user who does not know the user password can use the computer 10 until the time elapsed after the logon authentication has succeeded last exceeds a time limit. If the users having the authority of resetting the counter 301 are restricted, a time period for which the first authentication process is skipped can be prevented from being extended without limitation.

Figure 12:
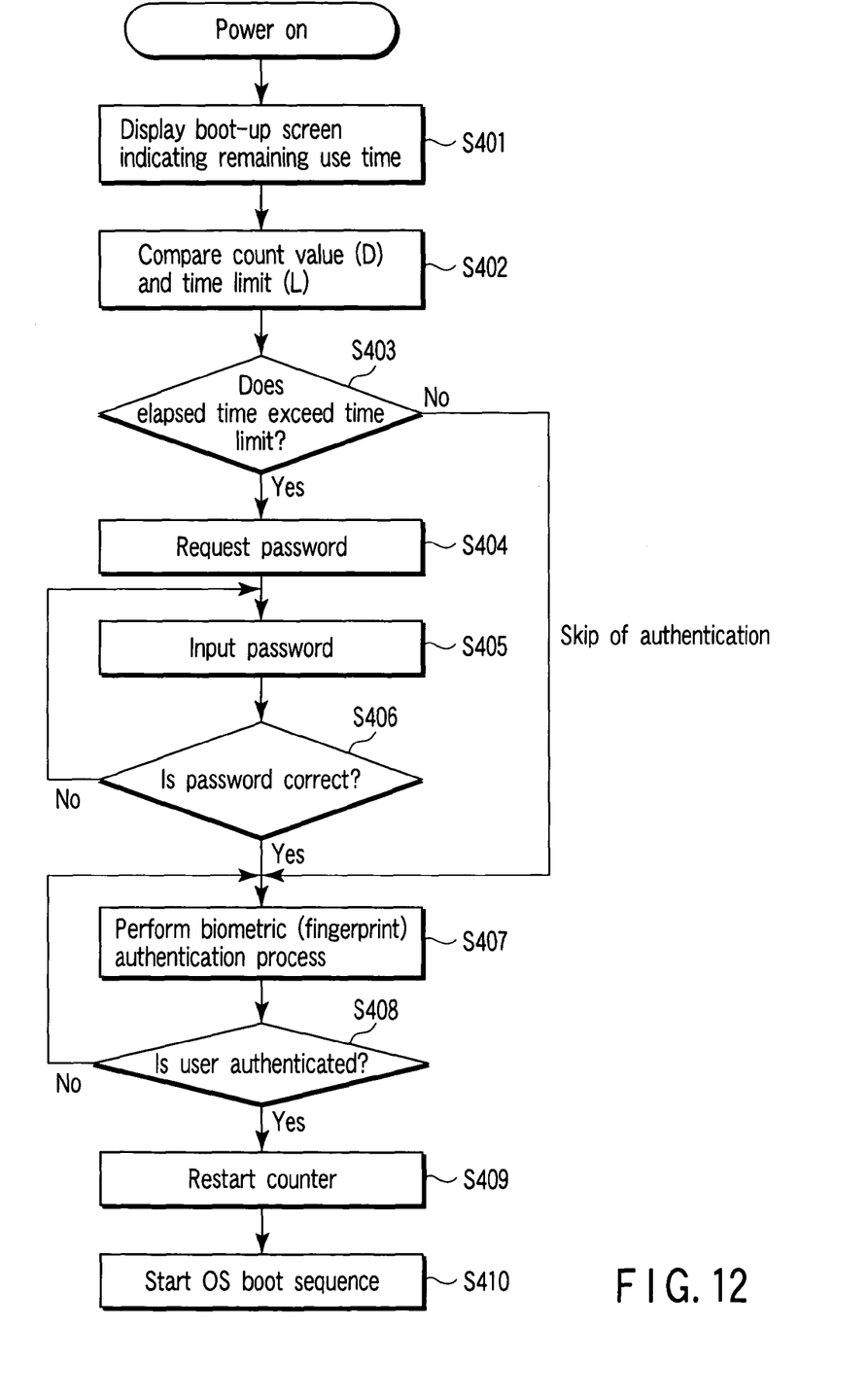
FIG. 12 is an exemplary flowchart of another specific procedure for performing the authentication control process by the information processing apparatus shown in FIG. 1.

Another specific procedure for performing the authentication control process will be described with reference to the flowchart shown in FIG. 12. Assume here that the first authentication process is a BIOS password authentication process and the second authentication process is a BIOS biometric authentication process.

When the computer 10 is powered on, the BIOS displays a boot-up screen indicating the remaining use time (the remaining use days) of the computer 10 on the LCD 20 (block S401). After the boot-up screen is displayed, the BIOS reads value D of the counter 301 and compares it with time limit L (block S402). On the basis of the comparison result, the BIOS determines whether value D exceeds time limit L, or whether the time elapsed from when a user is last authenticated in the second authentication process (BIOS biometric authentication process) exceeds time limit L (block S403).

If the elapsed time period D exceeds time limit L (YES in block S403), the BIOS displays an authentication screen on the LCD 20 and requests the user to input his or her user password in order to perform the first authentication process (block S404). The authentication screen displays a text message (PASSWORD=) that requests the user to input the user password.

When the user types the user password (block S405), the BIOS compares the typed user password with the registered user passwords and determines whether it is correct or not (block S406).

If the typed user password matches with the registered user passwords, or if the typed user password is correct (YES in block S406), the BIOS starts to perform the BIOS biometric authentication process of block S407.

On the other hand, if the elapsed time period D does not exceed the time limit L (NO in block S403), the BIOS skips blocks S404, S405 and S406 and moves to block S407 in order to skip the first authentication process.

In block S407, the BIOS displays an authentication screen on the LCD 20 and requests the user to input his or her fingerprint in order to perform the BIOS biometric authentication process. When the fingerprint sensor 16 senses the user fingerprint, the BIOS compares the sensed fingerprint with the fingerprints registered in advance in the computer 10 and determines whether the sensed fingerprint is correct or not (block S408).

If the sensed fingerprint is correct (YES in block S408), the BIOS resets the counter 301 and restarts to perform a count operation of the counter 301 (block S409). After that, the BIOS starts a boot sequence to boot up the operating system (block S410).

The BIOS password authentication process is skipped until the time elapsed from when the user last succeeds in BIOS biometric authentication exceeds the time limit. The user can thus use the computer 10 by a simple operation of putting his or her finger on the fingerprint sensor 16.

As described above, according to the embodiment of the invention, the first authentication process is skipped during a given period of time after a user is last authenticated in the second authentication process, and it is performed after the given period of time. Consequently, the computer 10 can be protected against unauthorized use without decreasing usability.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a main body;
   at least one processor;
   a first authentication module executing on the at least one processor when the main body is powered on, the first authentication module configured to perform a boot authentication process to determine whether a user is authenticated and further configured to allow an operating system to be booted when the user is authenticated by the boot authentication process, wherein the boot authentication process is performed by a basic input output system (BIOS) when the main body is powered on;
   a second authentication module configured to perform a logon authentication process to determine whether the user is allowed to log onto the operating system;
   a counter configured to count time elapsed since the user is authenticated by the logon authentication process;
   a resetting module configured to reset and restart the counter when the user is authenticated by the logon authentication process; and
   an authentication skip control module executing when the main body is powered on, the authentication skip control module configured to compare the elapsed time counted by the counter with a given time period in order to determine whether the given time period has elapsed and further configured to skip the boot authentication process in order to allow the operating system to be booted unless the given time period has elapsed.

2. The information processing apparatus according to claim 1, wherein the resetting module is configured to reset and restart the counter when the user is authenticated by the logon authentication process and it is determined in the logon authentication process that the user has specific authority.

3. The information processing apparatus according to claim 1, further comprising a unit which displays a time period remaining until a time period elapsed since the user is last authenticated in the logon authentication process reaches the given time period, as a remaining period of use time of the information processing apparatus.

4. A method of controlling authentication to restrict a user who uses an information processing apparatus, comprising:
   performing, on at least one processor, a boot authentication process to determine whether the user is authenticated when the information processing apparatus is powered on, and allowing an operating system to be booted when the user is authenticated in the boot authentication process, wherein the boot authentication process is performed by a basic input output system (BIOS) when the information processing apparatus is powered on;
   performing a logon authentication process to determine whether the user is allowed to log onto the operating system;
   resetting and restarting a counter configured to count time elapsed since the user was last authenticated by the logon authentication process;
   comparing, when the information processing apparatus is powered on, the elapsed time counted by the counter with a given time period in order to determine whether the given time period has elapsed; and
   skipping the boot authentication process in order to allow the operating system to be booted unless the given time period has elapsed.

5. The method according to claim 4, wherein the resetting and restarting the counter comprises resetting and restarting the counter when the user is authenticated by the logon authentication process and it is determined in the logon authentication process that the user has specific authority.

6. An information processing apparatus comprising:
   at least one processor;
   a first authentication module executing on the at least one processor when the information processing apparatus is powered on, the first authentication module configured to perform a first authentication process to determine whether a user is authenticated, wherein the first authentication process is performed by a basic input output system (BIOS) when the information processing apparatus is powered on;
   a second authentication module configured to perform a second authentication process to determine whether the user is authenticated, after the user is authenticated by the first authentication process;
   a counter configured to count time elapsed since the user is authenticated by the second authentication process;
   a resetting module configured to reset and restart the counter when the user is authenticated by the second authentication process; and
   an authentication skip control module executing when the information processing apparatus is powered on, the authentication skip control module configured to compare the elapsed time counted by the counter with a given time period in order to determine whether the given time period has elapsed and further configured to skip the first authentication process unless the given time period has elapsed.

7. The information processing apparatus according to the claim 6, wherein the second authentication process comprises a logon authentication process to determine whether the user is allowed to log onto an operating system.

* * * * *